(12) United States Patent
Yong et al.

(10) Patent No.: US 7,704,641 B2
(45) Date of Patent: *Apr. 27, 2010

(54) ORGANIC/INORGANIC COMPOSITE POROUS FILM AND ELECTROCHEMICAL DEVICE PREPARED THEREBY

(75) Inventors: Hyun Hang Yong, Seoul (KR); Sang Young Lee, Daejeon (KR); Seok Koo Kim, Daejeon (KR); Soon Ho Ahn, Daejeon (KR); Jung Don Suk, Daejeon (KR)

(73) Assignee: LG Chem, Ltd. (KR)

( * ) Notice: Subject to any disclaimer, the term of this patent is extended or adjusted under 35 U.S.C. 154(b) by 1329 days.

This patent is subject to a terminal disclaimer.

(21) Appl. No.: 11/175,881

(22) Filed: Jul. 6, 2005

(65) Prior Publication Data

US 2006/0008700 A1 Jan. 12, 2006

(30) Foreign Application Priority Data

| Jul. 7, 2004 | (KR) | ...................... 10-2004-0052638 |
| Sep. 2, 2004 | (KR) | ...................... 10-2004-0070097 |

(51) Int. Cl.
*H01M 2/16* (2006.01)

(52) U.S. Cl. .................. 429/251; 429/247; 429/129; 429/144; 429/122; 428/689

(58) Field of Classification Search .............. 429/251, 429/247, 129, 144, 122; 428/689
See application file for complete search history.

(56) References Cited

U.S. PATENT DOCUMENTS

| 4,615,913 A | 10/1986 | Jones et al. |
| 4,637,990 A | 1/1987 | Torobin |
| 5,707,567 A | 1/1998 | Pfaff |
| 6,416,905 B1 | 7/2002 | Bronstert et al. |
| 6,432,586 B1 | 8/2002 | Zhang |
| 7,211,352 B2 * | 5/2007 | Lee et al. ..................... 429/309 |

FOREIGN PATENT DOCUMENTS

| JP | 2003-022707 | 1/2003 |
| KR | 10-2003-0007659 | 1/2003 |
| KR | 10-2004-0005550 | 1/2004 |
| WO | 02/15299 | 2/2002 |

OTHER PUBLICATIONS

Journal of Power Sources vol. 112, No. 1, pp. 209-215, (2002).

(Continued)

*Primary Examiner*—Laura S Weiner
(74) *Attorney, Agent, or Firm*—Cantor Colburn LLP

(57) ABSTRACT

Disclosed is an organic/inorganic composite porous film comprising: (a) a porous substrate having pores; and (b) an active layer formed by coating a surface of the substrate or a part of the pores in the substrate with a mixture of inorganic particles and a binder polymer, wherein the inorganic particles in the active layer are interconnected among themselves and are fixed by the binder polymer, and interstitial volumes among the inorganic particles form a pore structure. A method for manufacturing the same film and an electrochemical device including the same film are also disclosed. An electrochemical device comprising the organic/inorganic composite porous film shows improved safety and quality, simultaneously.

16 Claims, 5 Drawing Sheets

OTHER PUBLICATIONS

Solid State Ionics vol. 158, No. 3, pp. 275-280, (2003).
Electrochimica Acta vol. 48, No. 14, pp. 2003-2008, (2003).
PCT International Search Report, PCT International Application No. PCT/KR2005/002133, Date of Mailing: Oct. 18, 2005.

Russian Office Action dated Jan. 21, 2008 for Application No. 2007101386/09(001484) ( All references cited in Office Action are listed above).

* cited by examiner

ORGANIC/INORGANIC COMPOSITE POROUS FILM AND ELECTROCHEMICAL DEVICE PREPARED THEREBY

TECHNICAL FIELD

The present invention relates to a novel organic/inorganic composite porous film that can show excellent thermal safety and lithium ion conductivity and a high degree of swelling with electrolyte compared to conventional polyolefin-based separators, and an electrochemical device comprising the same, which ensures safety and has improved quality.

BACKGROUND ART

Recently, there is an increasing interest in energy storage technology. Batteries have been widely used as energy sources in portable phones, camcorders, notebook computers, PCs and electric cars, resulting in intensive research and development into them. In this regard, electrochemical devices are subjects of great interest. Particularly, development of rechargeable secondary batteries is the focus of attention.

Secondary batteries are chemical batteries capable of repeated charge and discharge cycles by means of reversible interconversion between chemical energy and electric energy, and may be classified into Ni-MH secondary batteries and lithium secondary batteries. Lithium secondary batteries include secondary lithium metal batteries, secondary lithium ion batteries, secondary lithium polymer batteries, secondary lithium ion polymer batteries, etc.

Because lithium secondary batteries have drive voltage and energy density higher than those of conventional batteries using aqueous electrolytes (such as Ni-MH batteries), they are produced commercially by many production companies. However, most lithium secondary batteries have different safety characteristics depending on several factors. Evaluation of and security in safety of batteries are very important matters to be considered. Therefore, safety of batteries is strictly restricted in terms of ignition and combustion in batteries by safety standards.

Currently available lithium ion batteries and lithium ion polymer batteries use polyolefin-based separators in order to prevent short circuit between a cathode and an anode. However, because such polyolefin-based separators have a melting point of 200° C. or less, they have a disadvantage in that they can be shrunk or molten to cause a change in volume when the temperature of a battery is increased by internal and/or external factors. Therefore, there is a great possibility of short-circuit between a cathode and an anode caused by shrinking or melting of separators, resulting in accidents such as explosion of a battery caused by emission of electric energy. As a result, it is necessary to provide a separator that does not cause heat shrinking at high temperature.

To solve the above problems related with polyolefin-based separators, many attempts are made to develop an electrolyte using an inorganic material serving as a substitute for a conventional separator. Such electrolytes may be broadly classified into two types. The first type is a solid composite electrolyte obtained by using inorganic particles having lithium ion conductivity alone or by using inorganic particles having lithium ion conductivity mixed with a polymer matrix. See, Japanese Laid-Open Patent No. 2003-022707, ["Solid State Ionics"—vol. 158, n. 3, p. 275, (2003)], ["Journal of Power Sources"—vol. 112, n. 1, p. 209, (2002)], ["Electrochimica Acta"—vol. 48, n. 14, p. 2003, (2003)], etc. However, it is known that such composite electrolytes are not advisable, because they have low ion conductivity compared to liquid electrolytes and the interfacial resistance between the inorganic materials and the polymer is high while they are mixed.

The second type is an electrolyte obtained by mixing inorganic particles having lithium ion conductivity or not with a gel polymer electrolyte formed of a polymer and liquid electrolyte. In this case, inorganic materials are introduced in a relatively small amount compared to the polymer and liquid electrolyte, and thus merely have a supplementary function to assist in lithium ion conduction made by the liquid electrolyte.

As described above, electrolytes according to the prior art using inorganic particles have common problems as follows. First, when liquid electrolyte is not used, the interfacial resistance among inorganic particles and between inorganic particles and polymer excessively increases, resulting in degradation of quality. Next, the above-described electrolytes cannot be easily handled due to the brittleness thereof when an excessive amount of inorganic materials is introduced. Therefore, it is difficult to assemble batteries using such electrolytes. Particularly, most attempts made up to date are for developing an inorganic material-containing composite electrolyte in the form of a free standing film. However, it is practically difficult to apply such electrolyte in batteries due to poor mechanical properties such as high brittleness of the film. Even if the content of inorganic particles is reduced to improve mechanical properties, mixing inorganic particles with a liquid electrolyte causes a significant drop in mechanical properties due to the liquid electrolyte, resulting in a fail in the subsequent assemblage step of batteries. When a liquid electrolyte is injected after assemblage of a battery, dispersion of the electrolyte in a battery needs too long time and actual wettability with electrolyte is poor due to the high content of the polymer in the organic/inorganic composite film. Additionally, addition of inorganic particles for improving safety causes a problem of a significant drop in lithium ion conductivity. Further, because the electrolyte has no pores therein or, if any, has pores with a size of several angstroms (Å) and low porosity, the electrolyte cannot sufficiently serve as separator.

In addition, U.S. Pat. No. 6,432,586 discloses a composite film comprising a polyolefin-based separator coated with silica, etc., so as to improve the mechanical properties such as brittleness of the organic/inorganic composite electrolyte. However, because such films still use a polyolefin-based separator, they have a disadvantage in that it is not possible to obtain a significant improvement in safety including prevention of heat shrinking at high temperature.

BRIEF DESCRIPTION OF THE DRAWINGS

The foregoing and other objects, features and advantages of the present invention will become more apparent from the following detailed description when taken in conjunction with the accompanying drawings in which.

DISCLOSURE OF THE INVENTION

Figure 1:
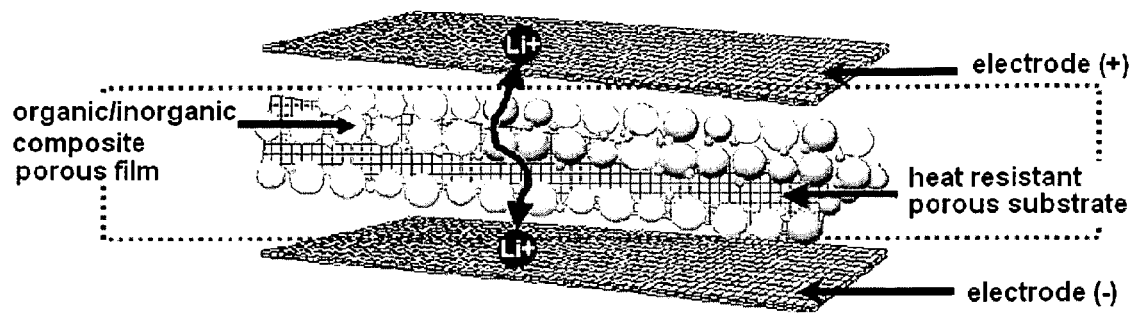
FIG. 1 is a schematic view showing an organic/inorganic composite porous film according to the present invention.

We have found that an organic/inorganic composite porous film, formed by using (1) a heat resistant porous substrate, (2) inorganic particles and (3) a binder polymer, improves poor thermal safety of a conventional polyolefin-based separator. Additionally, we have found that because the organic/inorganic composite porous film has pore structures present both in the porous substrate and in an active layer formed of the inorganic particles and the binder polymer coated on the porous substrate, it provides an increased volume of space, into which a liquid electrolyte infiltrates, resulting in improvements in lithium ion conductivity and degree of swelling with electrolyte. Therefore, the organic/inorganic composite porous film can improve the quality and safety of an electrochemical device using the same as separator.

Therefore, it is an object of the present invention to provide an organic/inorganic composite porous film capable of improving the quality and safety of an electrochemical device, a method for manufacturing the same and an electrochemical device comprising the same.

According to an aspect of the present invention, there is provided an organic/inorganic composite porous film, which comprises (a) a porous substrate having pores; and (b) an active layer formed by coating a surface of the substrate or a part of the pores in the substrate with a mixture of inorganic particles and a binder polymer, wherein the inorganic particles in the active layer are interconnected among themselves and are fixed by the binder polymer, and interstitial volumes among the inorganic particles form a pore structure. There is also provided an electrochemical device (preferably, a lithium secondary battery) comprising the same.

According to another aspect of the present invention, there is provided a method for manufacturing an organic/inorganic composite porous film, which includes the steps of: (a) dissolving a binder polymer into a solvent to form a polymer solution; (b) adding inorganic particles to the polymer solution obtained from step (a) and mixing them; and (c) coating the mixture of inorganic particles with a binder polymer obtained from step (b) on the surface of a substrate having pores or on a part of the pores in the substrate, followed by drying.

Hereinafter, the present invention will be explained in more detail.

The present invention is characterized in that it provides a novel organic/inorganic composite porous film, which serves sufficiently as separator to prevent electrical contact between a cathode and an anode of a battery and to pass ions therethrough, improves poor thermal safety related with a conventional polyolefin-based separator, and shows excellent lithium ion conductivity and a high degree of swelling with electrolyte.

The organic/inorganic composite porous film is obtained by coating a mixture of inorganic particles with a binder polymer on the surface of a porous substrate (preferably, a heat resistant substrate having a melting point of 200° C. or higher). The pores present in the substrate itself and a uniform pore structure formed in the active layer by the interstitial volumes among the inorganic particles permit the organic/inorganic composite porous film to be used as separator. Additionally, if a polymer capable of being gelled when swelled with a liquid electrolyte is used as the binder polymer component, the organic/inorganic composite porous film can serve also as electrolyte.

Particular characteristics of the organic/inorganic composite porous film are as follows.

Figure 2:
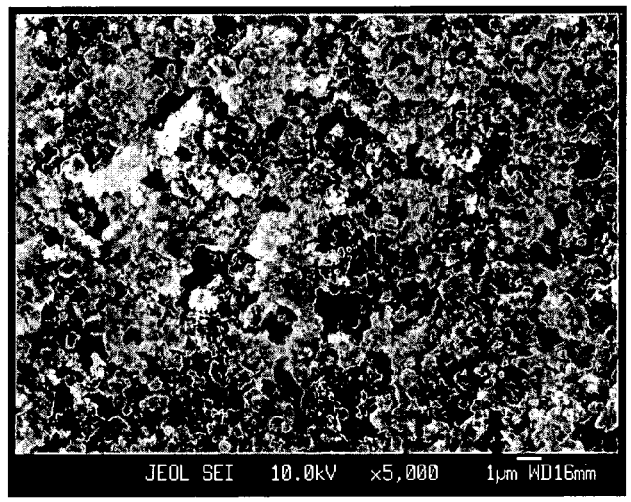
FIG. 2 is a photograph taken by a Scanning Electron Microscope (SEM) showing the organic/inorganic composite porous film (PVdF-CTFE/BaTiO$_3$) according to Example 1.

(1) Conventional solid electrolytes formed by using inorganic particles and a binder polymer have no pore structure or, if any, have an irregular pore structure having a pore size of several angstroms. Therefore, they cannot serve sufficiently as spacer, through which lithium ions can pass, resulting in degradation in the quality of a battery. On the contrary, the organic/inorganic composite porous film according to the present invention has uniform pore structures both in the porous substrate and in the active layer as shown in FIGS. 1 and 2, and the pore structures permit lithium ions to move smoothly therethrough. Therefore, it is possible to introduce a large amount of electrolyte through the pore structures so that a high degree of swelling with electrolyte can be obtained, resulting in improvement of battery quality.

(2) Conventional separators or polymer electrolytes are formed in the shape of free standing films and then assembled together with electrodes. On the contrary, the organic/inorganic composite porous film according to the present invention is formed by coating it directly on the surface of a porous substrate having pores so that the pores on the porous substrate and the active layer can be anchored to each other, thereby providing a firm physical bonding between the active layer and the porous substrate. Therefore, problems related with mechanical properties such as brittleness can be improved. Additionally, such increased interfacial adhesion between the porous substrate and the active coating layer can decrease the interfacial resistance. In fact, the organic/inorganic composite porous film according to the present invention includes the organic/inorganic composite active layer bonded organically to the porous substrate. Additionally, the active layer does not affect the pore structure present in the porous substrate so that the structure can be maintained. Further, the active layer itself has a uniform pore structure formed by the inorganic particles (see FIGS. 1 and 2). Because the above-mentioned pore structures are filled with a liquid electrolyte injected subsequently, interfacial resistance generated among the inorganic particles or between the inorganic particles and the binder polymer can be decreased significantly.

(3) The organic/inorganic composite porous film according to the present invention shows improved thermal safety by virtue of the heat resistant substrate and inorganic particles.

In other words, although conventional polyolefin-based separators cause heat shrinking at high temperature because they have a melting point of 120-140° C., the organic/inorganic composite porous film does not cause heat shrinking due to the heat resistance of the porous substrate having a melting point of 200° C. or higher and the inorganic particles. Therefore, an electrochemical device using the above organic/inorganic composite porous film as separator causes no degradation in safety resulting from an internal short circuit between a cathode and an anode even under extreme conditions such as high temperature, overcharge, etc. As a result, such electrochemical devices have excellent safety characteristics compared to conventional batteries.

Figure 4:
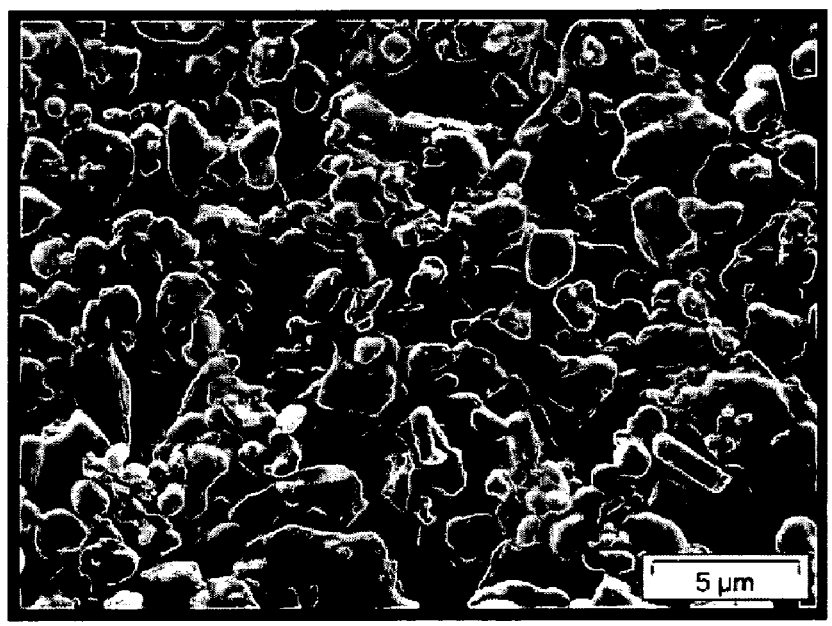
FIG. 4 is a photograph taken by SEM showing a conventional film (Al$_2$O$_3$—SiO$_2$/PET nonwoven) using no binder polymer according to the prior art.

(4) Nonwoven webs made of PET having a mixed layer of alumina ($Al_2O_3$) and silica ($SiO_2$) are known to one skilled in the art. However, such composite films use no binder polymer for supporting and interconnecting inorganic particles. Additionally, there is no correct understanding with regard to the particle diameter and homogeneity of the inorganic particles and a pore structure formed by the inorganic particles. Therefore, such composite films according to the prior art have a problem in that they cause degradation in the quality of a battery (see, FIG. 4). More particularly, when the inorganic particles have a relatively large diameter, the thickness of an organic/inorganic coating layer obtained under the same solid content increases, resulting in degradation in mechanical properties. Additionally, in this case, there is a great possibility of internal short circuit during charge/discharge cycles of a battery due to an excessively large pore size. Further, due to the lack of a binder that serves to fix the inorganic particles on the substrate, a finally formed film is deteriorated in terms of mechanical properties and has a difficult in applying to a practical battery assemblage process. For example, the composite films according to the prior art may not be amenable to a lamination process. On the contrary, we have recognized that control of the porosity and pore size of the organic/inorganic composite porous film according to the present invention is one of the factors affecting the quality of a battery. Therefore, we have varied and optimized the particle diameter of the inorganic particles or the mixing ratio of the inorganic particles with the binder polymer. In addition, according to the present invention, the binder polymer used in the active layer can serve, as binder, to interconnect and stably fix the inorganic particles among themselves, between the inorganic particles and the surface of the heat resistant porous substrate, and between the inorganic particles and a part of the pores in the substrate, thereby preventing degradation in mechanical properties of a finally formed organic/inorganic composite porous film.

(5) When the inorganic particles used in the active layer of the organic/inorganic composite porous film have high dielectric constant and/or lithium ion conductivity, the inorganic particles can improve lithium ion conductivity as well as heat resistance, thereby contributing to improvement of battery quality.

(6) When the binder polymer used in the organic/inorganic composite porous film is one showing a high degree of swelling with electrolyte, the electrolyte injected after assemblage of a battery can infiltrate into the polymer and the resultant polymer containing the electrolyte infiltrated therein has a capability of conducting electrolyte ions. Therefore, the organic/inorganic composite porous film according to the present invention can improve the quality of an electrochemical device compared to conventional organic/inorganic composite electrolytes. Additionally, the organic/inorganic composite porous film provides advantages in that wettablity with an electrolyte for battery is improved compared to conventional hydrophobic polyolefin-based separators, and use of a polar electrolyte for battery can be permitted.

(7) Finally, if the binder polymer is one capable of being gelled when swelled with electrolyte, the polymer reacts with the electrolyte injected subsequently and is gelled, thereby forming a gel type organic/inorganic composite electrolyte. Such electrolytes are produced with ease compared to conventional gel-type electrolytes and show excellent ion conductivity and a high degree of swelling with electrolyte, thereby contributing to improve the quality of a battery.

In the organic/inorganic composite porous film according to the present invention, there is no particular limitation in the substrate coated with the mixture of inorganic particles and binder polymer, as long as it is a porous substrate having pores. However, it is preferable to use a heat resistant porous substrate having a melting point of 200° C. or higher. Such heat resistant porous substrates can improve the thermal safety of the organic/inorganic composite porous film under external and/or internal thermal impacts.

Non-limiting examples of the porous substrate that may be used include polyethylene terephthalate, polybutylene terephthalate, polyester, polyacetal, polyamide, polycarbonate, polyimide, polyetherether ketone, polyether sulfone, polyphenylene oxide, polyphenylene sulfidro, polyethylene naphthalene or mixtures thereof. However, other heat resistant engineering plastics may be used with no particular limitation.

Although there is no particular limitation in thickness of the porous substrate, the porous substrate preferably has a thickness of between 1 μm and 100 μm, more preferably of between 5 μm and 50 μm. When the porous substrate has a thickness of less than 1 μm, it is difficult to maintain mechanical properties. When the porous substrate has a thickness of greater than 100 μm, it may function as resistance layer.

Although there is no particular limitation in pore size and porosity of the porous substrate, the porous substrate preferably has a porosity of between 5% and 95%. The pore size (diameter) preferably ranges from 0.01 μm to 50 μm, more preferably from 0.1 μm to 20 μm. When the pore size and porosity are less than 0.01 μm and 5%, respectively, the porous substrate may function as resistance layer. When the pore size and porosity are greater than 50 μm and 95%, respectively, it is difficult to maintain mechanical properties.

The porous substrate may take the form of a membrane or fiber. When the porous substrate is fibrous, it may be a nonwoven web forming a porous web (preferably, spunbond type web comprising long fibers or melt blown type web).

A spunbond process is performed continuously through a series of steps and provides long fibers formed by heating and melting, which is stretched, in turn, by hot air to form a web. A melt blown process performs spinning of a polymer capable of forming fibers through a spinneret having several hundreds of small orifices, and thus provides three-dimensional fibers having a spider-web structure resulting from interconnection of microfibers having a diameter of 10 μm or less.

In the organic/inorganic composite porous film according to the present invention, one component present in the active layer formed on the surface of the porous substrate or on a part of the pores in the porous substrate is inorganic particles currently used in the art. The inorganic particles permit an interstitial volume to be formed among them, thereby serving to form micropores and to maintain the physical shape as spacer. Additionally, because the inorganic particles are characterized in that their physical properties are not changed even at a high temperature of 200° C. or higher, the organic/ inorganic composite porous film using the inorganic particles can have excellent heat resistance.

There is no particular limitation in selection of inorganic particles, as long as they are electrochemically stable. In other words, there is no particular limitation in inorganic particles that may be used in the present invention, as long as they are not subjected to oxidation and/or reduction at the range of drive voltages (for example, 0-5 V based on Li/Li$^+$) of a battery, to which they are applied. Particularly, it is preferable to use inorganic particles having ion conductivity as high as possible, because such inorganic particles can improve ion conductivity and quality in an electrochemical device. Additionally, when inorganic particles having a high density are used, they have a difficulty in dispersion during a coating step and may increase the weight of a battery to be manufactured. Therefore, it is preferable to use inorganic particles having a density as low as possible. Further, when inorganic particles having a high dielectric constant are used, they can contribute to increase the dissociation degree of an electrolyte salt in a liquid electrolyte, such as a lithium salt, thereby improving the ion conductivity of the electrolyte.

For these reasons, it is preferable to use inorganic particles having a high dielectric constant of 5 or more, preferably of 10 or more, inorganic particles having lithium conductivity or mixtures thereof.

Particular non-limiting examples of inorganic particles having a dielectric constant of 5 or more include $BaTiO_3$, $Pb(Zr,Ti)O_3$ (PZT), $Pb_{1-x}La_xZr_{1-y}Ti_yO_3$ (PLZT, $0<x<1$, $0<y<1$), $PB(Mg_3Nb_{2/3})O_3$—$PbTiO_3$ (PMN-PT), hafnia ($HfO_2$), $SrTiO_3$, $SnO_2$, $CeO_2$, MgO, NiO, CaO, ZnO, $ZrO_2$, $Y_2O_3$, $Al_2O_3$, $TiO_2$ or mixtures thereof.

As used herein, "inorganic particles having lithium ion conductivity" are referred to as inorganic particles containing lithium elements and having a capability of conducting lithium ions without storing lithium. Inorganic particles having lithium ion conductivity can conduct and move lithium ions due to defects present in their structure, and thus can improve lithium ion conductivity and contribute to improve battery quality. Non-limiting examples of such inorganic particles having lithium ion conductivity include: lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $(LiAlTiP)_xO_y$ type glass ($0<x<4$, $0<y<13$) such as $14Li_2O$-$9Al_2O_3$-$38TiO_2$-$39P_2O_5$, lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), such as $Li_{3.25}Ge_{0.25}P_{0.75}S_4$, lithium nitrides ($Li_xN_y$, $0<x<4$, $0<y<2$) such as $Li_3N$, $SiS_2$ type glass ($Li_xSi_yS_z$, $0<x<3$, $0<y<2$, $0<z<4$) such as $Li_3PO_4$—$Li_2S$—$SiS_2$, $P_2S_5$ type glass ($Li_xP_yS_z$, $0<x<3$, $0<y<3$, $0<z<7$) such as $LiI$—$Li_2S$—$P_2S_5$, or mixtures thereof.

According to the present invention, inorganic particles having relatively high dielectric constant are used instead of inorganic particles having no reactivity or having a relatively low dielectric constant. Further, the present invention also provides a novel use of inorganic particles as separators.

The above-described inorganic particles, that have never been used as separators, for example $Pb(Zr,Ti)O_3$ (PZT), $Pb_{1-x}La_xZr_{1-y}Ti_yO_3$ (PLZT), $Pb(Mg_3Nb_{2/3})O_3$—$PbTiO_3$ (PMN-PT), hafnia ($HfO_2$), etc., have a high dielectric constant of 100 or more. The inorganic particles also have piezoelectricity so that an electric potential can be generated between both surfaces by the charge formation, when they are drawn or compressed under the application of a certain pressure. Therefore, the inorganic particles can prevent internal short circuit between both electrodes, thereby contributing to improve the safety of a battery. Additionally, when such inorganic particles having a high dielectric constant are combined with inorganic particles having lithium ion conductivity, synergic effects can be obtained.

The organic/inorganic composite porous film according to the present invention can form pores having a size of several micrometers by controlling the size of inorganic particles, content of inorganic particles and the mixing ratio of inorganic particles and binder polymer. It is also possible to control the pore size and porosity.

Although there is no particular limitation in size of inorganic particles, inorganic particles preferably have a size of 0.001-10 μm for the purpose of forming a film having a uniform thickness and providing a suitable porosity. When the size is less than 0.001 μm, inorganic particles have poor dispersibility so that physical properties of the organic/inorganic composite porous film cannot be controlled with ease. When the size is greater than 10 μm, the resultant organic/inorganic composite porous film has an increased thickness under the same solid content, resulting in degradation in mechanical properties. Furthermore, such excessively large pores may increase a possibility of internal short circuit being generated during repeated charge/discharge cycles.

The inorganic particles are present in the mixture of the inorganic particles with binder polymer forming the organic/inorganic composite porous film, preferably in an amount of 50-99 wt %, more particularly in an amount of 60-95 wt % based on 100 wt % of the total weight of the mixture. When the content of the inorganic particles is less than 50 wt %, the binder polymer is present in such a large amount as to decrease the interstitial volume formed among the inorganic particles and thus to decrease the pore size and porosity, resulting in degradation in the quality of a battery. When the content of the inorganic particles is greater than 99 wt %, the polymer content is too low to provide sufficient adhesion among the inorganic particles, resulting in degradation in mechanical properties of a finally formed organic/inorganic composite porous film.

In the organic/inorganic composite porous film according to the present invention, another component present in the active layer formed on the surface of the porous substrate or on a part of the pores in the porous substrate is a binder polymer currently used in the art. The binder polymer preferably has a glass transition temperature ($T_g$) as low as possible, more preferably $T_g$ of between $-200°$ C. and $200°$ C. Binder polymers having a low $T_g$ as described above are preferable, because they can improve mechanical properties such as flexibility and elasticity of a finally formed film. The polymer serves as binder that interconnects and stably fixes the inorganic particles among themselves, and thus prevents degradation in mechanical properties of a finally formed organic/inorganic composite porous film.

When the binder polymer has ion conductivity, it can further improve the quality of an electrochemical device. However, it is not essential to use a binder polymer having ion conductivity. Therefore, the binder polymer preferably has a dielectric constant as high as possible. Because the dissociation degree of a salt in an electrolyte depends on the dielectric constant of a solvent used in the electrolyte, the polymer having a higher dielectric constant can increase the dissociation degree of a salt in the electrolyte used in the present invention. The dielectric constant of the binder polymer may range from 1.0 to 100 (as measured at a frequency of 1 kHz), and is preferably 10 or more.

In addition to the above-described functions, the binder polymer used in the present invention may be further characterized in that it is gelled when swelled with a liquid electrolyte, and thus shows a high degree of swelling. Therefore, it is preferable to use a polymer having a solubility parameter of between 15 and 45 MPa$^{1/2}$, more preferably of between 15 and 25 MPa$^{1/2}$, and between 30 and 45 MPa$^{1/2}$. Therefore, hydrophilic polymers having a lot of polar groups are more preferable than hydrophobic polymers such as polyolefins. When the binder polymer has a solubility parameter of less than 15 Mpa$^{1/2}$ or greater than 45 Mpa$^{1/2}$, it has a difficulty in swelling with a conventional liquid electrolyte for battery.

Non-limiting examples of the binder polymer that may be used in the present invention include polyvinylidene fluoride-co-hexafluoropropylene, polyvinylidene fluoride-co-trichloroethylene, polymethylmethacrylate, polyacrylonitrile, polyvinylpyrrolidone, polyvinyl acetate, polyethylene-co-vinyl acetate, polyethylene oxide, cellulose acetate, cellulose acetate butyrate, cellulose acetate propionate, cyanoethylpullulan, cyanoethyl polyvinylalcohol, cyanoethylcellulose, cyanoethylsucrose, pullulan, carboxymetyl cellulose, acrylonitrile-styrene-butadiene copolymer, polyimide or mixtures thereof. Other materials may be used alone or in combination, as long as they satisfy the above characteristics.

The organic/inorganic composite porous film may further comprise additives other than the inorganic particles and binder polymer as still another component of the active layer.

As described above, the organic/inorganic composite porous film formed by coating the mixture of inorganic particles with binder polymer onto the porous substrate has pores contained in the porous substrate itself and forms pore structures in the substrate as well as in the active layer due to the interstitial volume among the inorganic particles, formed on the substrate. The pore size and porosity of the organic/inorganic composite porous film mainly depend on the size of inorganic particles. For example, when inorganic particles having a particle diameter of 1 µm or less are used, pores formed thereby also have a size of 1 µm or less. The pore structure is filled with an electrolyte injected subsequently and the electrolyte serves to conduct ions. Therefore, the size and porosity of the pores are important factors in controlling the ion conductivity of the organic/inorganic composite porous film. Preferably, the pores size and porosity of the organic/inorganic composite porous film according to the present invention range from 0.01 to 10 µm and from 5 to 95%, respectively.

There is no particular limitation in thickness of the organic/inorganic composite porous film according to the present invention. The thickness may be controlled depending on the quality of a battery. According to the present invention, the film preferably has a thickness of between 1 and 100 µm, more preferably of between 2 and 30 µm. Control of the thickness of the film may contribute to improve the quality of a battery.

There is no particular limitation in mixing ratio of inorganic particles to binder polymer in the organic/inorganic composite porous film according to the present invention. The mixing ratio can be controlled according to the thickness and structure of a film to be formed finally.

The organic/inorganic composite porous film may be applied to a battery together with a microporous separator (for example, a polyolefin-based separator), depending on the characteristics of a finally formed battery.

The organic/inorganic composite porous film may be manufactured by a conventional process known to one skilled in the art. One embodiment of a method for manufacturing the organic/inorganic composite porous film according to the present invention, includes the steps of: (a) dissolving a binder polymer into a solvent to form a polymer solution; (b) adding inorganic particles to the polymer solution obtained from step (a) and mixing them; and (c) coating the mixture of inorganic particles with binder polymer obtained from step (b) on the surface of a substrate having pores or on a part of the pores in the substrate, followed by drying.

Hereinafter, the method for manufacturing the organic/inorganic composite porous film according to the present invention will be explained in detail.

(1) First, a binder polymer is dissolved in a suitable organic solvent to provide a polymer solution.

It is preferable that the solvent has a solubility parameter similar to that of the polymer to be used and a low boiling point. Such solvents can be mixed uniformly with the polymer and can be removed easily after coating the polymer. Non-limiting examples of the solvent that may be used include acetone, tetrahydrofuran, methylene chloride, chloroform, dimethylformamide, N-methyl-2-pyrrolidone, cyclohexane, water or mixtures thereof.

(2) Next, inorganic particles are added to and dispersed in the polymer solution obtained from the preceding step to provide a mixture of inorganic particles with binder polymer.

It is preferable to perform a step of pulverizing inorganic particles after adding the inorganic particles to the binder polymer solution. The time needed for pulverization is suitably 1-20 hours. The particle size of the pulverized particles ranges preferably from 0.001 and 10 µm. Conventional pulverization methods, preferably a method using a ball mill, may be used.

Although there is no particular limitation in composition of the mixture containing inorganic particles and binder polymer, such composition can contribute to control the thickness, pore size and porosity of the organic/inorganic composite porous film to be formed finally.

In other words, as the weight ratio (I/P) of the inorganic particles (I) to the polymer (P) increases, porosity of the organic/inorganic composite porous film according to the present invention increases. Therefore, the thickness of the organic/inorganic composite porous film increases under the same solid content (weight of the inorganic particles+weight of the binder polymer). Additionally, the pore size increases in proportion to the pore formation among the inorganic particles. When the size (particle diameter) of the inorganic particles increases, interstitial distance among the inorganic particles increases, thereby increasing the pore size.

(3) The mixture of inorganic particles with binder polymer is coated on the heat resistant porous substrate, followed by drying to provide the organic/inorganic composite porous film.

In order to coat the porous substrate with the mixture of inorganic particles and binder polymer, any methods known to one skilled in the art may be used. It is possible to use various processes including dip coating, die coating, roll coating, comma coating or combinations thereof. Additionally, when the mixture containing inorganic particles and polymer is coated on the porous substrate, either or both surfaces of the porous substrate may be coated.

The organic/inorganic composite porous film according to the present invention, obtained as described above, may be used as separator in an electrochemical device, preferably in a lithium secondary battery. If the binder polymer used in the film is a polymer capable of being gelled when swelled with a liquid electrolyte, the polymer may react with the electrolyte injected after assembling a battery by using the separator, and thus be gelled to form a gel type organic/inorganic composite electrolyte.

The gel type organic/inorganic composite electrolyte according to the present invention is prepared with ease compared to gel type polymer electrolytes according to the prior art, and has a large space to be filled with a liquid electrolyte due to its microporous structure, thereby showing excellent ion conductivity and a high degree of swelling with electrolyte, resulting in improvement in the quality of a battery.

Further, the present invention provides an electrochemical device comprising: (a) a cathode; (b) an anode; (c) the organic/inorganic composite porous film according to the present invention, interposed between the cathode and anode; and (d) an electrolyte.

Such electrochemical devices include any devices in which electrochemical reactions occur and particular examples thereof include all kinds of primary batteries, secondary batteries, fuel cells, solar cells or capacitors. Particularly, the electrochemical device is a lithium secondary battery including a lithium metal secondary battery, lithium ion secondary battery, lithium polymer secondary battery or lithium ion polymer secondary battery.

According to the present invention, the organic/inorganic composite porous film contained in the electrochemical device serves as separator. If the polymer used in the film is a polymer capable of being gelled when swelled with electrolyte, the film may serve also as electrolyte. In addition to the above organic/inorganic composite porous film, a microporous separator, for example a polyolefin-based separator may be used together.

The electrochemical device may be manufactured by a conventional method known to one skilled in the art. In one embodiment of the method for manufacturing the electrochemical device, the electrochemical device is assembled by using the organic/inorganic composite porous film interposed between a cathode and anode, and then an electrolyte is injected.

The electrode that may be applied together with the organic/inorganic composite porous film according to the present invention may be formed by applying an electrode active material on a current collector according to a method known to one skilled in the art. Particularly, cathode active materials may include any conventional cathode active materials currently used in a cathode of a conventional electrochemical device. Particular non-limiting examples of the cathode active material include lithium intercalation materials such as lithium manganese oxides, lithium cobalt oxides, lithium nickel oxides, lithium iron oxides or composite oxides thereof. Additionally, anode active materials may include any conventional anode active materials currently used in an anode of a conventional electrochemical device. Particular non-limiting examples of the anode active material include lithium intercalation materials such as lithium metal, lithium alloys, carbon, petroleum coke, activated carbon, graphite or other carbonaceous materials. Non-limiting examples of a cathode current collector include foil formed of aluminum, nickel or a combination thereof. Non-limiting examples of an anode current collector include foil formed of copper, gold, nickel, copper alloys or a combination thereof.

The electrolyte that may be used in the present invention includes a salt represented by the formula of $A^+B^-$, wherein $A^+$ represents an alkali metal cation selected from the group consisting of $Li^+$, $Na^+$, $K^+$ and combinations thereof, and $B^-$ represents an anion selected from the group consisting of $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ and combinations thereof, the salt being dissolved or dissociated in an organic solvent selected from the group consisting of propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethylmethyl carbonate (EMC), gamma-butyrolactone (GBL) and mixtures thereof. However, the electrolyte that may be used in the present invention is not limited to the above examples.

More particularly, the electrolyte may be injected in a suitable step during the manufacturing process of an electrochemical device, according to the manufacturing process and desired properties of a final product. In other words, electrolyte may be injected, before an electrochemical device is assembled or in a final step during the assemblage of an electrochemical device.

Processes that may be used for applying the organic/inorganic composite porous film to a battery include not only a conventional winding process but also a lamination (stacking) and folding process of a separator and electrode.

When the organic/inorganic composite porous film according to the present invention is applied to a lamination process, it is possible to significantly improve the thermal safety of a battery, because a battery formed by a lamination and folding process generally shows more severe heat shrinking of a separator compared to a battery formed by a winding process. Additionally, when a lamination process is used, there is an advantage in that a battery can be assembled with ease by virtue of excellent adhesion of the polymer present in the organic/inorganic composite porous film according to the present invention. In this case, the adhesion can be controlled depending on the content of inorganic particles and content and properties of the polymer. More particularly, as the polarity of the polymer increases and as the glass transition temperature (Tg) or melting point (Tm) of the polymer decreases, higher adhesion between the organic/inorganic composite porous film and electrode can be obtained.

BEST MODE FOR CARRYING OUT THE INVENTION

Reference will now be made in detail to the preferred embodiments of the present invention. It is to be understood that the following examples are illustrative only and the present invention is not limited thereto.

Example 1-6

Preparation of Organic/Inorganic Composite Porous Film and Manufacture of Lithium Secondary Battery Using the Same

Example 1

1-1. Preparation of Organic/Inorganic Composite Porous Film (PVdF-CTFE/BaTiO$_3$)

PVdF-CTFE polymer (polyvinylidene fluoride-chlorotrifluoroethylene copolymer) was added to acetone in the amount of about 5 wt % and dissolved therein at 50° C. for about 12 hours or more to form a polymer solution. To the polymer solution obtained as described above, BaTiO$_3$ powder was added with the concentration of 20 wt % on the solid content basis. Then, the BaTiO$_3$ powder was pulverized into a size of about 300 nm and dispersed for about 12 hours or more by using a ball mill method to form slurry. Then, the slurry obtained as described above was coated on a porous polyethylene terephthalate substrate (porosity: 80%) having a thickness of about 20 μm by using a dip coating process to a coating layer thickness of about 2 μm. After measuring with a porosimeter, the active layer impregnated into and coated on the porous polyethylene terephthalate substrate had a pore size of 0.3 μm and a porosity of 55%.

1-2. Manufacture of Lithium Secondary Battery (Manufacture of Cathode)

To N-methyl-2-pyrrolidone (NMP) as a solvent, 92 wt % of lithium cobalt composite oxide ($LiCoO_2$) as cathode active material, 4 wt % of carbon black as conductive agent and 4 wt % of PVDF (polyvinylidene fluoride) as binder were added to form slurry for a cathode. The slurry was coated on Al foil having a thickness of 20 μm as cathode collector and dried to form a cathode. Then, the cathode was subjected to roll press.

(Manufacture of Anode)

To N-methyl-2-pyrrolidone (NMP) as solvent, 96 wt % of carbon powder as anode active material, 3 wt % of PVDF (polyvinylidene fluoride) as binder and 1 wt % of carbon black as conductive agent were added to form mixed slurry for an anode. The slurry was coated on Cu foil having a thickness of 10 μm as anode collector and dried to form an anode. Then, the anode was subjected to roll press.

(Manufacture of Battery)

The cathode and anode obtained as described above were stacked with the organic/inorganic composite porous film obtained as described in Example 1-1 to form an assembly. Then, an electrolyte (ethylene carbonate (EC)/ethylemethyl carbonate (EMC)=1:2 (volume ratio) containing 1M of lithium hexafluorophosphate ($LiPF_6$)) was injected thereto to provide a lithium secondary battery.

Example 2

Example 1 was repeated to provide a lithium secondary battery, except that PMNPT (lead magnesium niobate-lead titanate) powder was used instead of $BaTiO_3$ powder to obtain an organic/inorganic composite porous film (PVdF-CTFE/PMNPT). After measuring with a porosimeter, the active layer impregnated into and coated on the porous polyethylene terephthalate substrate had a pore size of 0.4 μm and a porosity of 60%.

Example 3

Example 1 was repeated to provide a lithium secondary battery, except that mixed powder of $BaTiO_3$ and $Al_2O_3$ (weight ratio=30:70) was used instead of $BaTiO_3$ powder to obtain an organic/inorganic composite porous film (PVdF-CTFE/$BaTiO_3$—$Al_2O_3$). After measuring with a porosimeter, the active layer impregnated into and coated on the porous polyethylene terephthalate substrate had a pore size of 0.2 μm and a porosity of 50%.

Example 4

Example 1 was repeated to provide a lithium secondary battery, except that PVdF-CTFE was not used but about 2 wt % of carboxymethyl cellulose (CMC) polymer was added to water and dissolved therein at 60° C. for about 12 hours or more to form a polymer solution, and the polymer solution was used to obtain an organic/inorganic composite porous film (CMC/$BaTiO_3$). After measuring with a porosimeter, the active layer impregnated into and coated on the porous polyethylene terephthalate substrate had a pore size of 0.4 μm and a porosity of 58%.

Example 5

Example 1 was repeated to provide a lithium secondary battery, except that neither PVdF-CTFE nor $BaTiO_3$ powder was used, and PVDF-HFP and lithium titanium phosphate ($LiTi_2(PO_4)_3$) powder were used to obtain an organic/inorganic composite porous film (PVdF-HFP/$LiTi_2(PO_4)_3$) comprising a porous polyethylene terephthalate substrate (porosity: 80%) having a thickness of about 20 μm coated with an active layer having a thickness of about 2 μm. After measuring with a porosimeter, the active layer impregnated into and coated on the porous polyethylene terephthalate substrate had a pore size of 0.4 μm and a porosity of 58%.

Example 6

Example 1 was repeated to provide a lithium secondary battery, except that neither PVdF-CTFE nor $BaTiO_3$ powder was used, and PVDF-HFP and mixed powder of $BaTiO_3$ and $LiTi_2(PO_4)_3$ (weight ratio=50:50) were used to obtain an organic/inorganic composite porous film (PVdF-HFP/$LiTi_2(PO_4)_3$—$BaTiO_3$). After measuring with a porosimeter, the active layer impregnated into and coated on the porous polyethylene terephthalate substrate had a pore size of 0.3 μm and a porosity of 53%.

Comparative Examples 1-3

Comparative Example 1

Example 1 was repeated to provide a lithium secondary battery, except that a conventional poly propylene/polyethylene/polypropylene (PP/PE/PP) separator (see, FIG. 3) was used. The separator had a pore size of 0.01 μm or less and a porosity of about 5%.

Comparative Example 2

Example 1 was repeated to provide a lithium secondary battery, except that $LiTi_2(PO_4)_3$ and PVDF-HFP were used with a weight ratio of 10:90 to obtain an organic/inorganic composite porous film. After measuring with a porosimeter, the organic/inorganic composite porous film had a pore size of 0.01 μm or less and a porosity of about 5%.

Comparative Example 3

Example 1 was repeated to provide a lithium secondary battery, except that PP/PE/PP separator was used as porous substrate, and $BaTiO_3$ and PVDF-HFP were used with a weight ratio of 10:90 to obtain an organic/inorganic composite porous film. After measuring with a porosimeter, the organic/inorganic composite porous film had a pore size of 0.01 μm or less and a porosity of about 5%.

Experimental Example 1

Surface Analysis of Organic/Inorganic Composite Porous Film

The following test was performed to analyze the surface of an organic/inorganic composite porous film according to the present invention.

The sample used in this test was PVdF-CTFE/$BaTiO_3$ obtained according to Example 1. As control, a PP/PE/PP separator was used.

Figure 3:
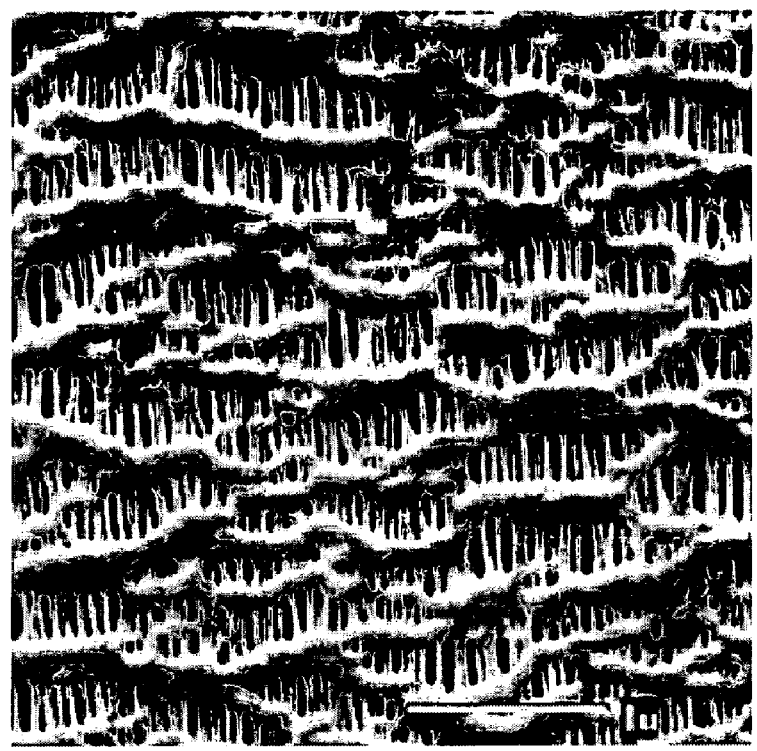
FIG. 3 is a photograph taken by SEM showing a polyolefin-based separator (PP/PE/PP) used in Comparative Example 1.

When analyzed by using a Scanning Electron Microscope (SEM), the PP/PE/PP separator according to Comparative Example 1 showed a conventional microporous structure (see, FIG. 3). On the contrary, the organic/inorganic composite porous film according to the present invention showed a pore structure formed in the porous substrate itself and pore structure formed by the surface of the porous substrate as well as a part of the pores in the porous substrate, which are coated with inorganic particles (see, FIG. 2).

Experimental Example 2

Evaluation of Heat Shrinkage of Organic/Inorganic Composite Porous Film

The following experiment was performed to compare the organic/inorganic composite porous film with a conventional separator.

The organic/inorganic composite porous film (PVdF-CTFE/BaTiO$_3$) obtained by using a heat resistant porous substrate according to Example 1 was used as sample. The conventional PP/PE/PP separator and the organic/inorganic composite porous film (PVdF-HFP/BaTiO$_3$) obtained by using a conventional polyolefin-based separator according to Comparative Example 3 were used as controls.

Figure 5:
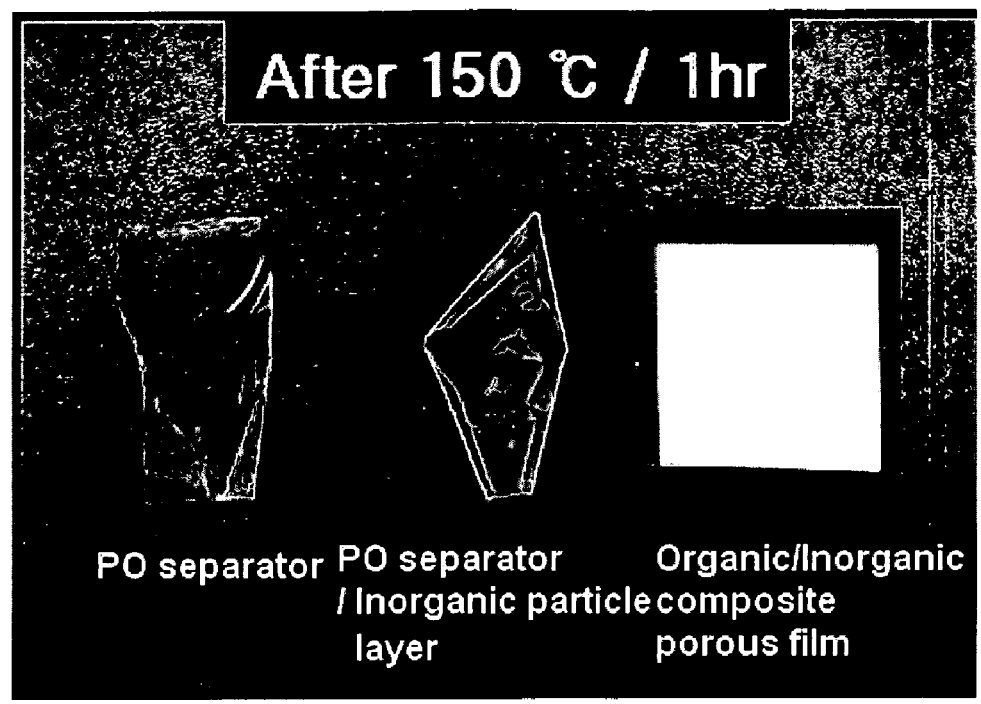
FIG. 5 is a photograph showing the organic/inorganic composite porous film (PVdF-CTFE/BaTiO$_3$) according to Example 1 compared to a currently used PP/PE/PP separator and the organic/inorganic composite porous film (PVdF-HFP/BaTiO$_3$) according to Comparative Example 3, which has an inorganic material layer formed on a PP/PE/PP separator, after each of the samples are maintained at 150° C. for 1 hour.

Each of the test samples were checked for its heat shrinkage after stored at a high temperature of 150° C. for 1 hour. The test samples provided different results after the lapse of 1 hour at 150° C. The PP/PE/PP separator as control was shrunk due to high temperature to leave only the outer shape thereof. Similarly, the film according to Comparative Example 3 having a layer of inorganic particles formed on the PP/PE/PP separator was shrunk significantly. This indicates that even if heat resistant inorganic particles are used, a conventional polyolefine-based separator having poor thermal stability cannot provide improved thermal safety by itself. On the contrary, the organic/inorganic composite porous film according to the present invention showed good results with no heat shrinkage (see, FIG. 5)

As can be seen from the foregoing, the organic/inorganic composite porous film according to the present invention has excellent thermal safety.

Experimental Example 3

Evaluation for Safety of Lithium Secondary Battery

The following test was performed to evaluate the safety of each lithium secondary battery comprising the organic/inorganic composite porous film according to the present invention.

Lithium secondary batteries according to Examples 1-6 were used as samples. As controls, used were the battery using a currently used PP/PE/PP separator according to Comparative Example 1, the battery using the LiTi$_2$(PO$_4$)$_3$/PVdF-HFP film (weight ratio=10:90 on the wt % basis) as separator according to Comparative Example 2, and the battery using the film comprising BaTiO$_3$/PVdF-HFP coating layer (weight ratio=10:90 on the wt % basis) formed on a currently used PP/PE/PP separator according to Comparative Example 3.

3-1. Hot Box Test

Each battery was stored at high temperatures of 150° C. and 160° C. for 1 hour and then checked. The results are shown in the following Table 1.

After storing at high temperatures, each of the batteries using a currently used PP/PE/PP separator according to Comparative Examples 1 and 3 caused explosion when stored at 160° C. for 1 hour. This indicates that polyolefin-based separators cause extreme heat shrinking, melting and breakage when stored at high temperature, resulting in internal short circuit between both electrodes (i.e., a cathode and anode) of a battery. On the contrary, lithium secondary batteries comprising the organic/inorganic composite porous film according to the present invention showed such a safe state as to prevent firing and burning even at a high temperature of 160° C. (see, Table 1).

Therefore, it can be seen that the lithium secondary battery comprising an organic/inorganic composite porous film according to the present invention has excellent thermal safety.

TABLE 1

| | Hot Box Test Conditions | |
|---|---|---|
| | 150° C./1 hr | 160° C./1 hr |
| Ex. 1 | O | O |
| Ex. 2 | O | O |
| Ex. 3 | O | O |
| Ex. 4 | O | O |
| Ex. 5 | O | O |
| Ex. 6 | O | O |
| Comp. Ex. 1 | O | X |
| Comp. Ex. 2 | O | O |
| Comp. Ex. 3 | O | X |

3-2. Overcharge Test

Each battery was charged under the conditions of 6V/1A and 10V/1A and then checked. The results are shown in the following Table 2.

Figure 6:
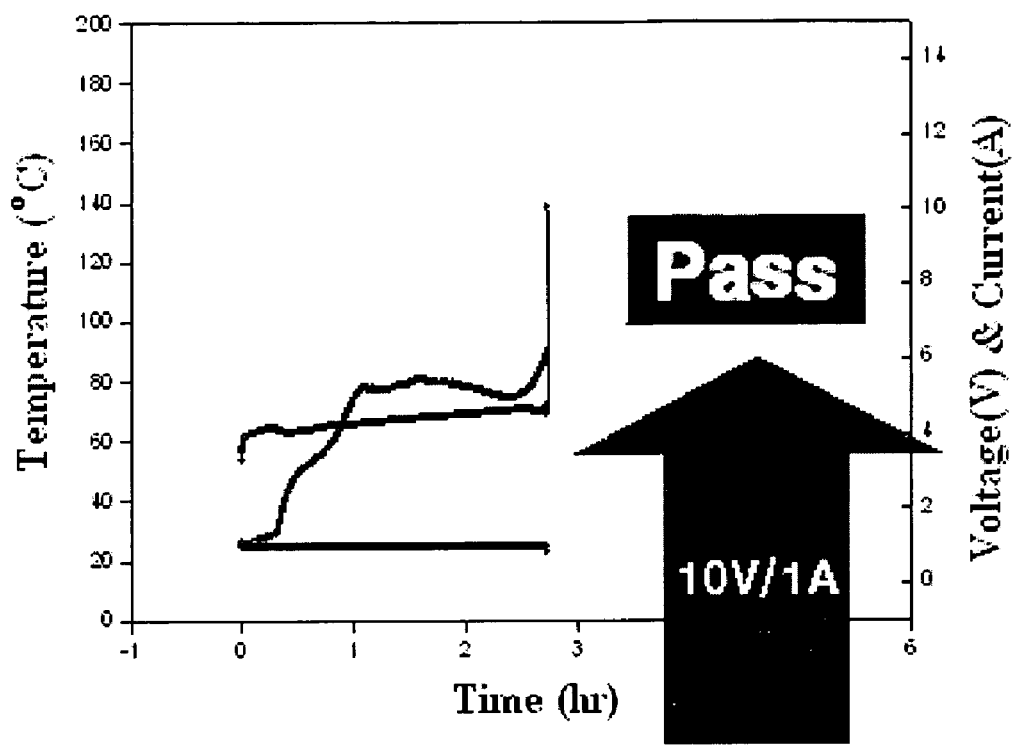
FIG. 6 is a picture and graph showing the results of an overcharge test for the lithium secondary battery including a currently used PP/PE/PP separator according to Comparative Example 1 and the lithium secondary battery including the organic/inorganic composite porous film (PVdF-CTFE/BaTiO$_3$) according to Example 1.
Figure 6:
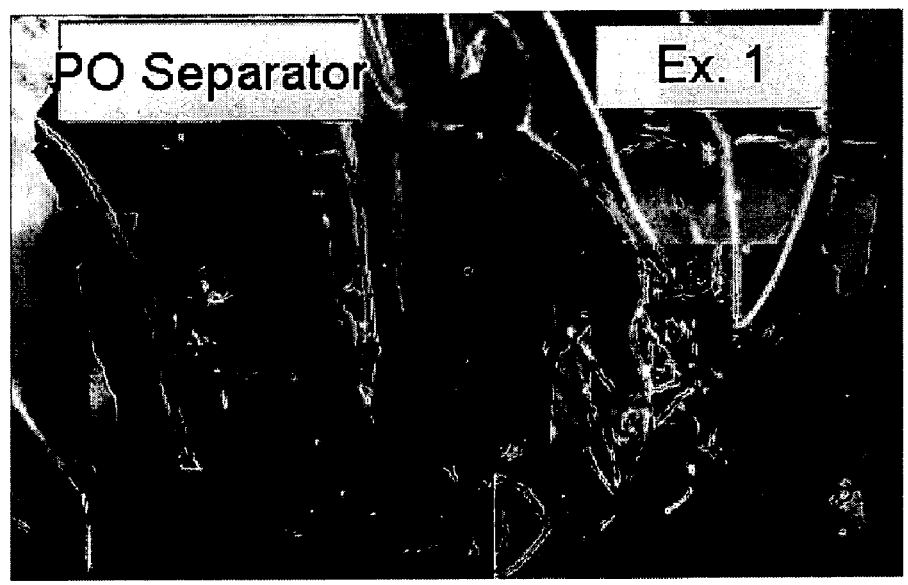

After checking the batteries comprising a currently used PP/PE/PP separator according to Comparative Examples 1 and 3, they exploded (see, FIG. 6). This indicates that the polyolefin-based separator is shrunk by overcharge of the battery to cause short circuit between electrodes, resulting in degradation in safety of the battery. On the contrary, each lithium secondary battery comprising an organic/inorganic composite porous film according to the present invention showed excellent safety under overcharge conditions (see, Table 2 and FIG. 6).

TABLE 2

| | Overcharge Test Conditions | |
|---|---|---|
| | 6 V/1 A | 10 V/1 A |
| Ex. 1 | O | O |
| Ex. 2 | O | O |
| Ex. 3 | O | O |
| Ex. 4 | O | O |
| Ex. 5 | O | O |
| Ex. 6 | O | O |
| Comp. Ex. 1 | X | X |
| Comp. Ex. 2 | O | O |
| Comp. Ex. 3 | X | X |

Experimental Example 4

Evaluation for Quality of Lithium Secondary Battery

The following tests were performed in order to evaluate high-rate discharge characteristics and cycle characteristics of each lithium secondary battery comprising an organic/inorganic composite porous film according to the present invention.

4-1. Evaluation for C-Rate Characteristics

Lithium secondary batteries according to Examples 1-6 were used as samples. As controls, used were the battery using a currently used PP/PE/PP separator according to Comparative Example 1, the battery using the LiTi$_2$(PO$_4$)$_3$/PVdF-HFP film (weight ratio=10:90 on the wt % basis) as separator according to Comparative Example 2, and the battery using the film comprising BaTiO$_3$/PVdF-HFP coating layer (weight ratio=10:90 on the wt % basis) formed on a currently used PP/PE/PP separator according to Comparative Example 3.

Each battery having a capacity of 760 mAh was subjected to cycling at a discharge rate of 0.5C, 1C and 2C. The following Table 3 shows the discharge capacity of each battery, the capacity being expressed on the basis of C-rate characteristics.

After performing the test, the batteries according to Comparative Examples 2 and 3, each using, as separator, an organic/inorganic composite porous film that includes a mixture containing inorganic particles with a high dielectric constant or inorganic particles with lithium ion conductivity and a binder polymer in a ratio of 10:90 (on the wt % basis), showed a significant drop in capacity depending on discharge rates, as compared to the batteries using, as separators, the organic/inorganic composite porous film obtained from the above Examples according to the present invention and a conventional polyolefin-based separator (see, Table 3). This indicates that such relatively low amount of inorganic particles compared to the polymer may decrease the pore size and porosity in the pore structure formed by interstitial volume among the inorganic particles, resulting in degradation in the quality of a battery.

Figure 7:
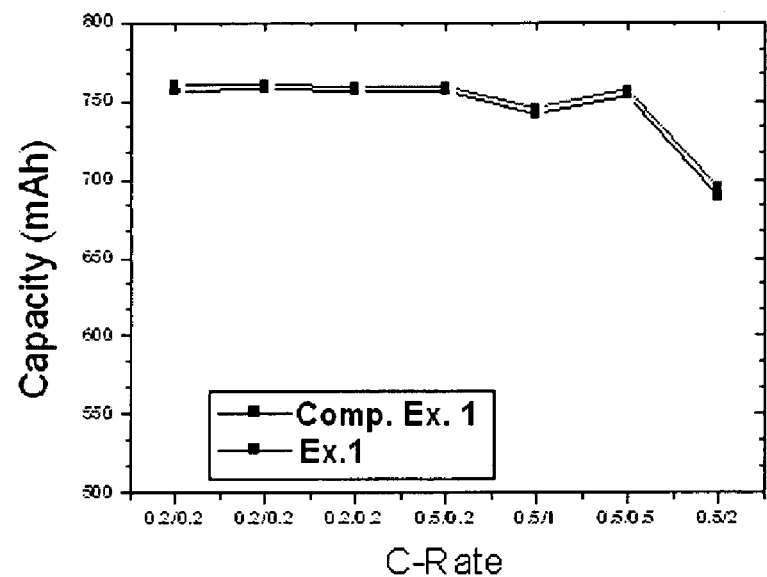
FIG. 7 is a graph showing the high rate discharge characteristics (C-rate) of the lithium secondary battery including a currently used PP/PE/PP separator according to Comparative Example 1 and the lithium secondary battery including the organic/inorganic composite porous film (PVdF-CTFE/BaTiO$_3$) according to Example 1.

On the contrary, lithium secondary batteries comprising the organic/inorganic composite porous film according to the present invention showed C-rate characteristics comparable to those of the battery using a conventional polyolefin-based separator under a discharge rate of up to 2C (see, Table 3 and FIG. 7).

TABLE 3

| | Discharge Rate (mAh) | | |
|---|---|---|---|
| | 0.5 C | 1 C | 2 C |
| Ex. 1 | 756 | 745 | 692 |
| Ex. 2 | 757 | 747 | 694 |
| Ex. 3 | 758 | 746 | 693 |
| Ex. 4 | 755 | 742 | 691 |
| Ex. 5 | 756 | 745 | 792 |
| Ex. 6 | 757 | 747 | 791 |
| Comp. Ex. 1 | 752 | 741 | 690 |
| Comp. Ex. 2 | 630 | 582 | 470 |
| Comp. Ex. 3 | 612 | 551 | 434 |

4-2. Evaluation for Cycle Characteristics

The lithium secondary battery using the organic/inorganic composite porous film (PVdF-CTFE/BaTiO$_3$) according to Example 1 and the lithium secondary battery using a currently used PP/PE/PP separator according to Comparative Example 1 were used. Each battery was charged at a temperature of 23° C. with an electric current of 0.5C under a voltage of 4.2-3V. Then, initial capacity of each battery was measured and each battery was subjected to 300 charge/discharge cycles.

Figure 8:
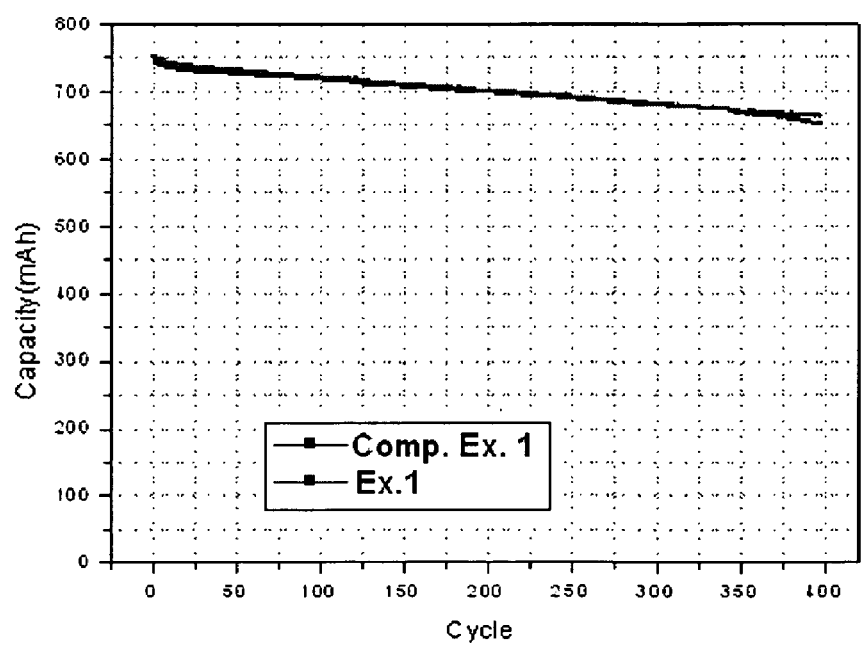
FIG. 8 is a graph showing the cycle characteristics of the lithium secondary battery including a currently used PP/PE/PP separator according to Comparative Example 1 and the lithium secondary battery including the organic/inorganic composite porous film (PVdF-CTFE/BaTiO$_3$) according to Example 1.

After performing the test, the lithium secondary battery using an organic/inorganic composite porous film according to the present invention as separator showed an efficiency of 80% or more even after 300 cycles. In other words, the lithium secondary battery according to the present invention showed cycle characteristics comparable to those of the battery using a conventional polyolefin-based separator (see, FIG. 8). Therefore, it can be seen that the electrochemical device comprising the organic/inorganic composite porous film according to the present invention shows long service life.

INDUSTRIAL APPLICABILITY

As can be seen from the foregoing, the organic/inorganic composite porous film according to the present invention can solve the problem of poor thermal safety occurring in a conventional polyolefin-based separator by using a heat resistant porous substrate. Additionally, the organic/inorganic composite porous film according to the present invention has pore structures formed in the porous substrate itself as well as in the active layer formed on the substrate by using inorganic particles and a binder polymer, thereby increasing the space to be filled with an electrolyte, resulting in improvement in a degree of swelling with electrolyte and lithium ion conductivity. Therefore, the organic/inorganic composite porous film according to the present invention contributes to improve the thermal safety and quality of a lithium secondary battery using the same as separator.

While this invention has been described in connection with what is presently considered to be the most practical and preferred embodiment, it is to be understood that the invention is not limited to the disclosed embodiment and the drawings. On the contrary, it is intended to cover various modifications and variations within the spirit and scope of the appended claims.

The invention claimed is:

1. An organic/inorganic composite porous film, which comprises:
   (a) a porous substrate having pores; and
   (b) an active layer formed by coating a surface of the substrate or a part of the pores in the substrate with a mixture of inorganic particles and a binder polymer, wherein the inorganic particles in the active layer are interconnected among themselves and are fixed by the binder polymer, and interstitial volumes among the inorganic particles form a pore structure,
   wherein the porous substrate has a melting point of 200° C. or higher, and is at least one selected from the group consisting of polyethylene terephthalate, polybutylene terephthalate, polyester, polyacetal, polyamide, polycarbonate, polyimide, polyetherether ketone, polyether sulfone, polyphenylene oxide, polyphenylene sulfide and polyethylene naphthalene, and
   wherein the binder polymer is at least one selected from the group consisting of polyvinylidene fluoride-co-hexafluoropropylene, polyvinylidene fluoride-co-trichloroethylene, polymethylmethacrylate, polyacrylonitrile, polyvinylpyrrolidone, polyvinyl acetate, polyethylene-co-vinyl acetate, polyethylene oxide, cellulose acetate, cellulose acetate butyrate, cellulose acetate propionate, cyanoethylpullulan, cyanoethyl polyvinylalcohol, cyanoethylcellulose, cyanoethylsucrose, pullulan, carboxymethyl cellulose, acrylonitrile-styrene-butadiene copolymer and polyimide.

2. The organic/inorganic composite porous film according to claim 1, wherein the inorganic particles are at least one selected from the group consisting of: (a) inorganic particles having a dielectric constant of 5 or more; and (b) inorganic particles having lithium ion conductivity.

3. The organic/inorganic composite porous film according to claim 2, wherein the inorganic particles having a dielectric constant of 5 or more are BaTiO$_3$, Pb(Zr,Ti)O$_3$ (PZT), Pb$_{1-x}$La$_x$Zr$_{1-y}$Ti$_y$O$_3$ (PLZT, 0<x<1, 0<y<1), Pb(Mg$_3$Nb$_{2/3}$)O$_3$—PbTiO$_3$ (PMN-PT), hafnia (HfO$_2$), SrTiO$_3$, SnO$_2$, CeO$_2$, MgO, NiO, CaO, ZnO, ZrO$_2$, Y$_2$O$_3$, Al$_2$O$_3$ or TiO$_2$.

4. The organic/inorganic composite porous film according to claim 2, wherein the inorganic particles having lithium ion conductivity are at least one selected from the group consisting of: lithium phosphate (Li$_3$PO$_4$), lithium titanium phosphate [Li$_x$Ti$_y$(PO$_4$)$_3$, 0<x<2, 0<y<3], lithium aluminum titanium phosphate [Li$_x$Al$_y$Ti$_z$(PO$_4$)$_3$, 0<x<2, 0<y<1, 0<z<3], (LiAlTiP)$_x$O$_y$ glass [0<x<4, 0<y<13], lithium lanthanum titanate [Li$_x$La$_y$TiO$_3$, 0<x<2, 0<y<3], lithium germanium thiophosphate [Li$_x$Ge$_y$P$_z$S$_w$, 0<x<4, 0<y<1, 0<z<1, 0<w<5], lithium nitrides [Li$_x$N$_y$, 0<x<4, 0<y<2], SiS$_2$ glass [Li$_x$Si$_y$S$_z$, 0<x<3, 0<y<2, 0<z<4] and P$_2$S$_5$ glass [Li$_x$P$_y$S$_z$, 0<x<3, 0<y<3, 0<z<7].

5. The organic/inorganic composite porous film according to claim 1, wherein the inorganic particles have a size of between 0.001 μm and 10 μm.

6. The organic/inorganic composite porous film according to claim 1, wherein the inorganic particles are present in the mixture of inorganic particles with the binder polymer in an amount of 50-99 wt % based on 100 wt % of the mixture.

7. The organic/inorganic composite porous film according to claim 1, wherein the binder polymer has a glass transition temperature (Tg) of between −200° C. and 200° C.

8. The organic/inorganic composite porous film according to claim 1, wherein the binder polymer has a solubility parameter of between 15 and 45 MPa$^{1/2}$.

9. The organic/inorganic composite porous film according to claim 1, wherein the porous substrate has a pore size of between 0.01 and 50 μm and the organic/inorganic composite porous film has a pore size of between 0.01 and 10 μm.

10. The organic/inorganic composite porous film according to claim 1, which has a porosity of between 5% and 95%.

11. The organic/inorganic composite porous film according to claim 1, which has a thickness of between 1 and 100 μm.

12. An electrochemical device comprising:
    (a) a cathode;
    (b) an anode;
    (c) an organic/inorganic composite porous film as defined in claim 1, which is interposed between the cathode and anode; and
    (d) an electrolyte.

13. The electrochemical device according to claim 12, which is a lithium secondary battery.

14. The electrochemical device according to claim 12, which further comprises a microporous separator.

15. The electrochemical device according to claim 14, wherein the microporous separator is a polyolefin-based separator.

16. A method for manufacturing an organic/inorganic composite porous film as defined in claim 1, which comprises the steps of:
    (a) dissolving a binder polymer into a solvent to form a polymer solution;
    (b) adding inorganic particles to the polymer solution obtained from step (a) and mixing them; and
    (c) coating the mixture of inorganic particles with binder polymer obtained from step (b) on the surface of a substrate having pores or on a part of the pores in the substrate, followed by drying,
    wherein the porous substrate has a melting point of 200° C. or higher, and is at least one selected from the group consisting of polyethylene terephthalate, polybutylene terephthalate, polyester, polyacetal, polyamide, polycarbonate, polyimide, polyetherether ketone, polyether sulfone, polyphenylene oxide, polyphenylene sulfide and polyethylene naphthalene, and
    wherein the binder polymer is at least one selected from the group consisting of polyvinylidene fluoride-co-hexafluoropropylene, polyvinylidene fluoride-co-trichloroethylene, polymethylmethacrylate, polyacrylonitrile, polyvinylpyrrolidone, polyvinyl acetate, polyethylene-co-vinyl acetate, polyethylene oxide, cellulose acetate, cellulose acetate butyrate, cellulose acetate propionate, cyanoethylpullulan, cyanoethyl polyvinylalcohol, cyanoethylcellulose, cyanoethylsucrose, pullulan, carboxymethyl cellulose, acrylonitrile-styrene-butadiene copolymer and polyimide.

\* \* \* \* \*